(12) United States Patent
Hutchison et al.

(10) Patent No.: US 6,698,453 B1
(45) Date of Patent: Mar. 2, 2004

(54) PRESSURIZATION CONTROL DEVICE FOR ELECTRONIC EQUIPMENT ENCLOSURES

(75) Inventors: Randall D. Hutchison, Shawnee, KS (US); Tomasz Taubert, Leawood, KS (US)

(73) Assignee: Special Product Company, Overland Park, KS (US)

( * ) Notice: Subject to any disclaimer, the term of this patent is extended or adjusted under 35 U.S.C. 154(b) by 179 days.

(21) Appl. No.: 10/101,640

(22) Filed: Mar. 19, 2002

Related U.S. Application Data

(60) Provisional application No. 60/277,137, filed on Mar. 19, 2001.

(51) Int. Cl.[7] ............................................. F16K 11/10
(52) U.S. Cl. ...................................... 137/881; 631/679
(58) Field of Search ................... 137/879, 881; 361/679, 691; 174/15.1

(56) References Cited

U.S. PATENT DOCUMENTS 4,515,751 A * 5/1985 Krieg, Jr. .................... 422/86
4,705,076 A * 11/1987 Krechel et al. ............. 137/883
5,801,632 A * 9/1998 Opal .......................... 340/585

* cited by examiner

Primary Examiner—John Fox
(74) Attorney, Agent, or Firm—Hovey Williams LLP

(57) ABSTRACT

A pressurization control device (10) for controlling positive pressurization of an electronic equipment enclosure, such as, for example, a telecommunications equipment enclosure (12 or 14), wherein the device (10) combines and integrates a number of valves or other control components and functions into a single, common valve body (28) or manifold providing a single, shared penetration point (54) into the enclosure (12 or 14), thereby advantageously minimizing the number of penetrations into and potential leakage points from the enclosure (12 or 14). The valves or other control components may be substantially conventional and may include, for example, a cable air tube connection fitting (30); a pressure cutoff valve (32); a pressure relief valve (34); and a static pressure valve or air stem (36); an express fitting (38); and an on/off valve (40).

20 Claims, 9 Drawing Sheets

SECTION A-A

SECTION B-B

SECTION C-C

PRESSURIZATION CONTROL DEVICE FOR ELECTRONIC EQUIPMENT ENCLOSURES

RELATED APPLICATIONS

This application claims priority benefit, with regard to all common subject matter, of a provisional application titled "Universal Air Valve/Air control Device", Ser. No. 60/277,137, filed Mar. 19, 2001, which is hereby incorporated into the present application by reference.

BACKGROUND OF THE INVENTION

1. Field of the Invention

The present invention relates to pneumatic control devices, such as, for example, air valves, for controlling pressurization of electronic equipment enclosures. More particularly, the present invention relates to a pressurization control device for controlling positive pressurization of an electronic equipment enclosure, such as, for example, a telecommunications equipment enclosure, wherein the device combines and integrates a number of valves or other control components and functions into a single, common valve body or manifold providing a single, shared penetration point into the enclosure, thereby advantageously minimizing the number of penetrations into and potential leakage points from the enclosure.

2. Description of the Prior Art

It is often desirable to provide an enclosure for locating, operationally supporting, and protectively housing electronic equipment. Signal repeater cards, for example, and other electronic equipment used by telecommunication service providers are typically housed in enclosures that are mounted high on telephone poles, underground in manholes, or in other similarly hostile environments. A typical telecommunication equipment enclosure broadly comprises a body operable to receive the equipment; a removable lid operable to cooperate with the body to substantially enclose the equipment while providing access thereto; and a mounting mechanism for securely locating and orienting the enclosure in its proper operating position.

It will be appreciated that the enclosure must protect the electronic equipment from a variety of potentially damaging environmental hazards, including, for example, sun, rain, flooding, snow, and dust and other particulate matter. One well-known way of accomplishing such protection is to seal and positively pressurize the enclosure to minimize or substantially prevent intrusion of potentially damaging moisture and dust or other particulate matter into the enclosure. Such positive pressurization is commonly accomplished by introducing compressed air, nitrogen, or a similar gas into the enclosure. In telecommunication applications, for example, compressed air is typically produced by a compressor at a central office and sent through a main cable trunk, through a cable stub spliced into the main cable trunk, and into the enclosure.

To control the pressurization process and maintain an optimum pressure, the enclosure is typically provided with a number of valves or other pneumatic control components, including, for example, a pressure cutoff valve (PCV) to control the flow of gas into the enclosure; a pressure relief valve (PRV) to prevent over-pressurization; a static pressure valve to allow for quickly pressurizing the enclosure from a local source, which is useful, for example, when testing the pressure relief valve and testing for leaks. These control components are typically discrete items, with each requiring its own penetration point into the enclosure. Unfortunately, any penetration of the enclosure gives rise to a risk of pressure leakage, so that the aforementioned separately-penetrating control components combine to substantially increase the overall risk of leakage. Such leaks, it will be appreciated, may reduce the enclosure's internal pressure and allow damaging moisture or dust or other particulate matter to enter, or may require a larger volume and faster flow rate of gas into the enclosure to compensate for the lost air. Furthermore, separately manufacturing and installing the various discrete pneumatic control components can involve substantial costly and labor intensive redundancy.

Due to the above-identified and other limitations of the current art, a need exists for an improved mechanism for providing and controlling pressurization of electronic equipment enclosures.

SUMMARY OF THE INVENTION

The present invention solves the above-described and other problems and provides a distinct advance in the art of pneumatic control devices, such as, for example, air valves, for controlling pressurization of electronic equipment enclosures. More particularly, the present invention relates to a pressurization control device for controlling positive pressurization of an electronic equipment enclosure, such as, for example, the telecommunications equipment enclosure described above, wherein the device combines and integrates a number of valves or other control components and functions with a single, common valve body or manifold providing a single, shared penetration point into the enclosure. Such positive pressurization is desirable as it minimizes or substantially prevents moisture, dust and other particulate matter, and other potentially damaging materials from entering the enclosure.

In a preferred embodiment, the device broadly comprises the valve body, and includes a plurality of valves or other control components connected to the valve body, such as, for example, a cable air tube connection fitting; a pressure cutoff valve (PCV); a pressure relief valve (PRV); and a static pressure valve or air stem; an express port; and an on/off valve.

The valve body provides a single, common manifold in which or to which the control components are provided or connected and through which these components can access an interior of the enclosure. Externally, the valve body provides a plurality of connection points, with a separate connection point provided for receiving each of the different control components. Internally, the valve body provides a number of passages leading from the connection points to the single, shared penetration point into the enclosure. The penetration point is a shared passageway or duct which projects into or otherwise aligns with an opening in the enclosure. A large O-ring, gasket, or other mechanism may be included which substantially surrounds the penetration point to minimize or substantially prevent leakage between the valve body and the enclosure.

The cable air tube connection fitting is operable to receive an air tube extending from the cable stub, and to thereby introduce compressed air from the cable stub into the valve body. Inside the valve body, a first passage extends from the connection point for the connection fitting to an inlet port of the PCV.

The PCV is operable to start, stop, and otherwise control the flow of compressed air from the connection fitting into the enclosure. An internal valve is manually actuatable to open and close the inlet port of the PCV. When the inlet port is open, air flows from the cable stub, through the tube, through the connection fitting, through the first passage, through the PCV, through the penetration point passageway, and into the enclosure.

The PRV is operable to prevent over-pressurization of the enclosure by automatically releasing air when the enclosure's internal pressure exceeds a preestablished maximum pressure. A second passage connects the connection point of the PRV to the penetration point passageway. In one embodiment, the PRV includes an internal spring, the loading on which is caused by and therefore correspond to the internal pressure of the enclosure, and includes a built-in adjustment nut for calibrating the PRV and establishing the aforementioned maximum pressure.

The static pressure valve, or air stem, is operable to allow for manually pressurizing the enclosure using a local air source, which is useful, for example, when testing the PRV and when testing the enclosure for leaks. A third passage connects the connection point of the static pressure valve with the penetration point passageway. In one embodiment, the static pressure valve provides internal threads for coupling with a standard air stem retraction valve, and presents an outer diameter dimensioned to accept a standard air chuck.

The express fitting is operable to allow for quickly pressurizing the enclosure using a direct connection to a portable gas supply, such as, for example, a tank of pressurized nitrogen gas. The connection point of the express fitting connects to an inlet port of the on/off valve. When using the express fitting to pressurize the enclosure, the PCV is placed in an off position to prevent the pressurized gas supplied by the portable gas supply from being lost or forced down the cable stub.

The on/off valve is operable to stop, start, and otherwise control introduction into the enclosure of the gas from the local or portable gas supply via the express fitting.

Thus, it will be appreciated that the pressurization control device of the present invention provides a number of advantages over the prior art, including, for example, that it combines and integrates previously discrete valves and other control components into a single valve body providing a single, shared penetration point into the enclosure, thereby substantially reducing the number of required penetration points and the corresponding potential for leaks. Relatedly, the device reduces to manufacturing costs and installation labor by allowing the various valves and other control components to be pre-installed on the valve body and subsequently installed as a unit on the enclosure.

These and other features of the present invention are more fully described below in the section entitled DETAILED DESCRIPTION OF A PREFERRED EMBODIMENT.

BRIEF DESCRIPTION OF THE DRAWING FIGURES

A preferred embodiment of the present invention is described in detail below with reference to the attached drawing figures, wherein.

Figure 6:
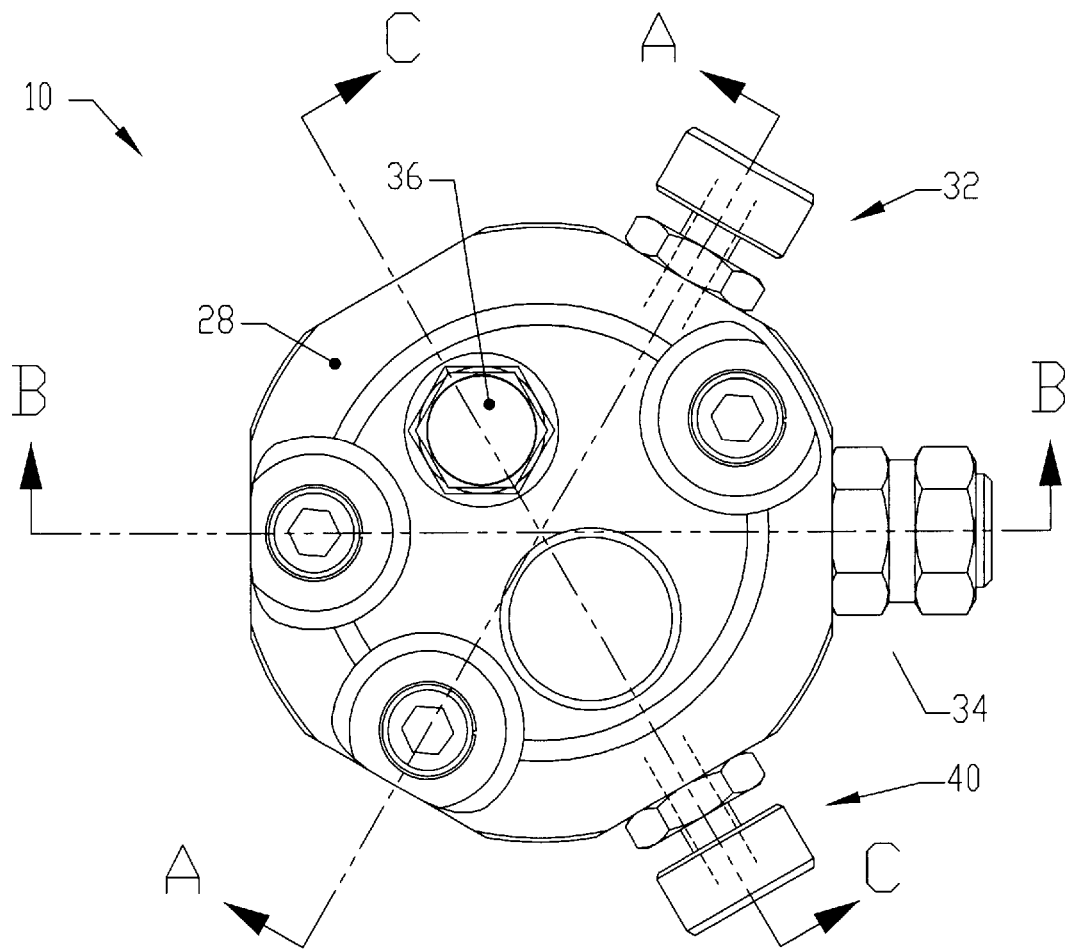
FIG. 6 is a plan view of the preferred embodiment of the pressurization control device of the present invention.
Figure 8:
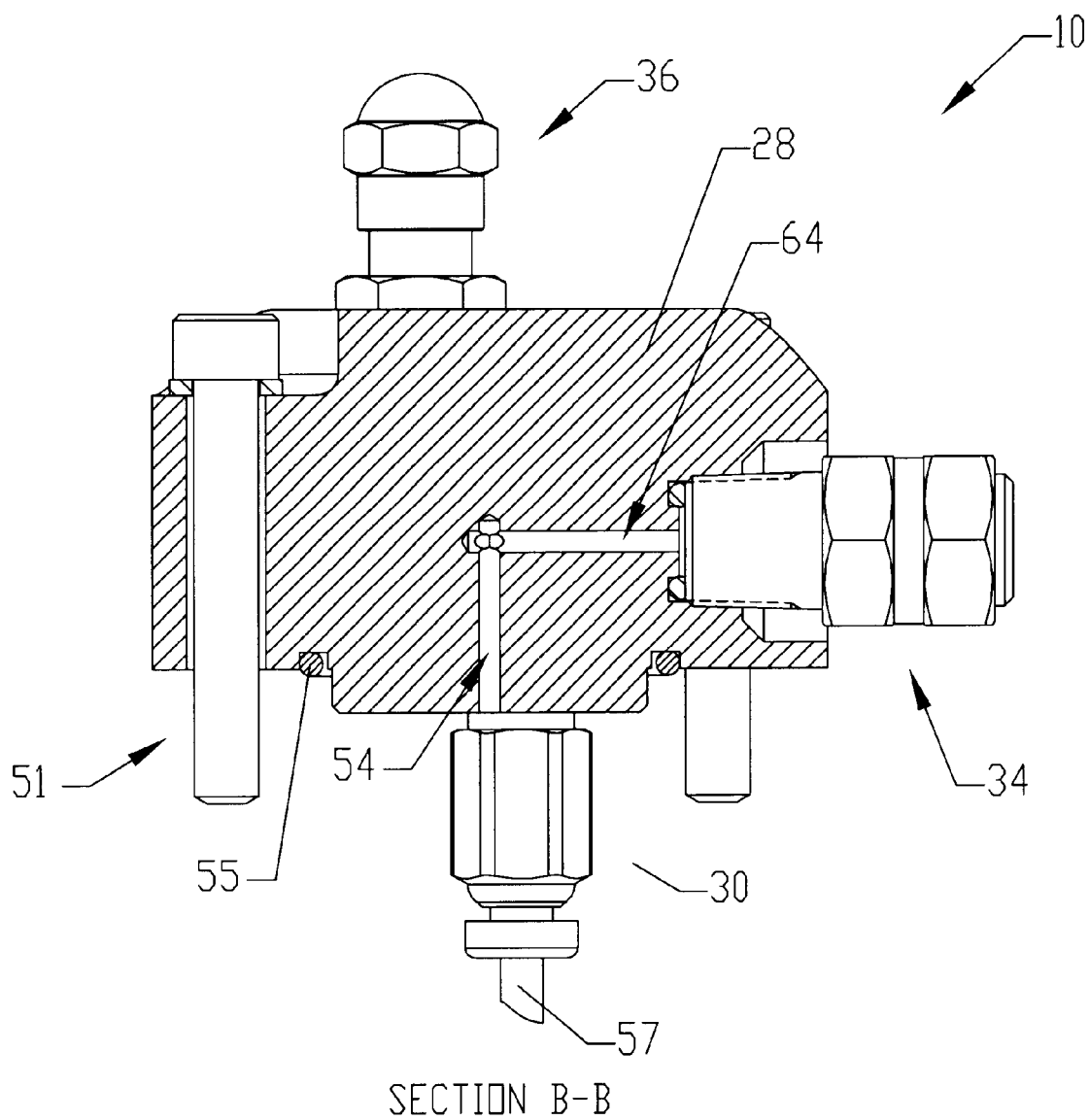
Figure 9:
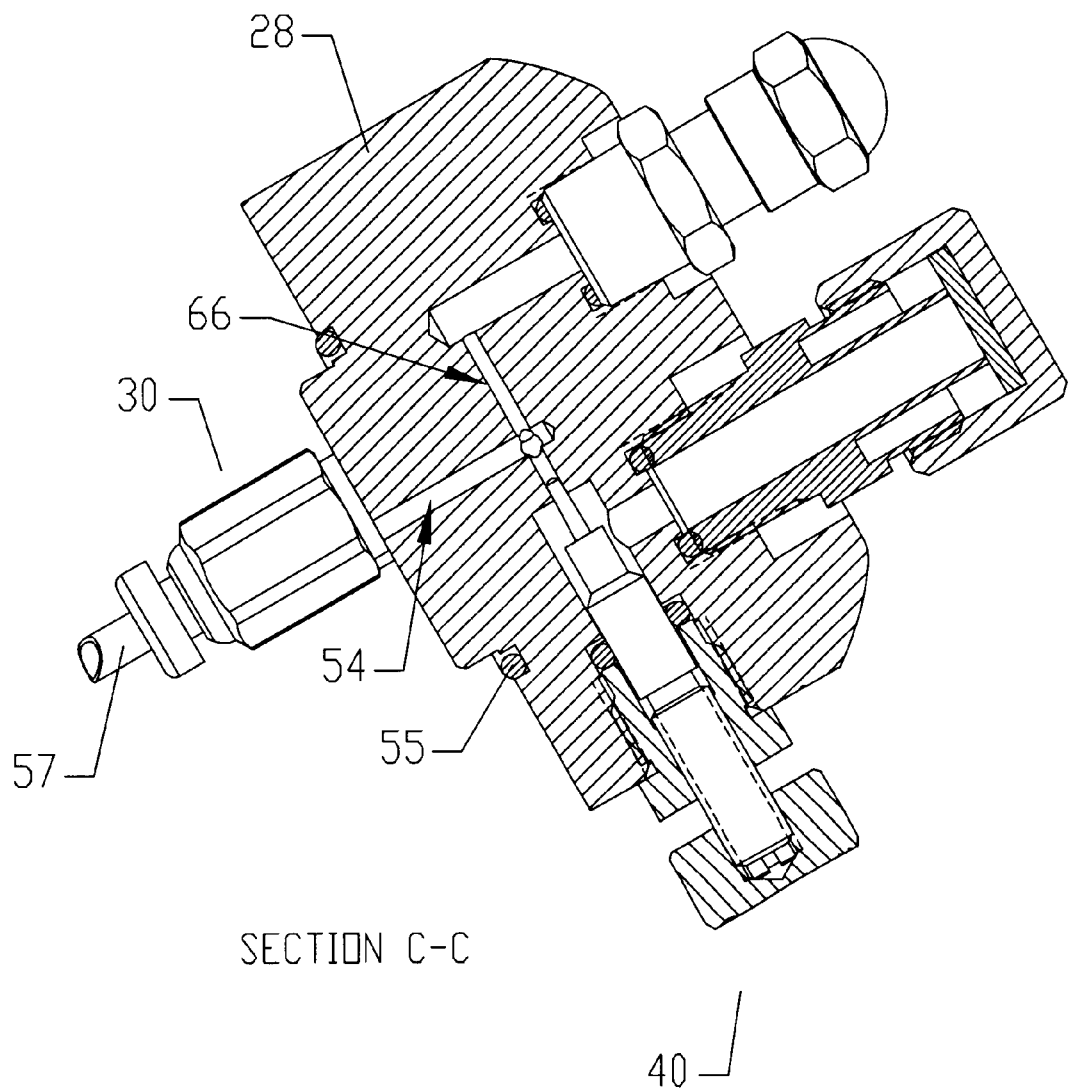

FIG. 8 is a second sectional view of the preferred embodiment of the pressurization control device of the present invention taken along line B—B of FIG. 6 to better show a pressure relief valve portion of the pressure control device; and FIG. 9 is a third sectional view of the preferred embodiment of the pressurization control device of the present invention taken along line C—C of FIG. 6 to better show an on/off valve portion of the pressure control device.

DETAILED DESCRIPTION OF A PREFERRED EMBODIMENT

Referring to the figures, a pressurization control device 10 is shown constructed in accordance with a preferred embodiment of the present invention and operable to control pressurization of an electronic equipment enclosure. The device 10 may be installed upon substantially any pressurizeable electronic equipment enclosure operable to store or house electronic equipment. As illustrated in FIGS. 1, 2, 3, and 4, for example, the device 10 is shown installed upon both a substantially cylindrical first telecommunications equipment enclosure 12 and a substantially rectangular second telecommunications equipment enclosure 14.

Figure 1:
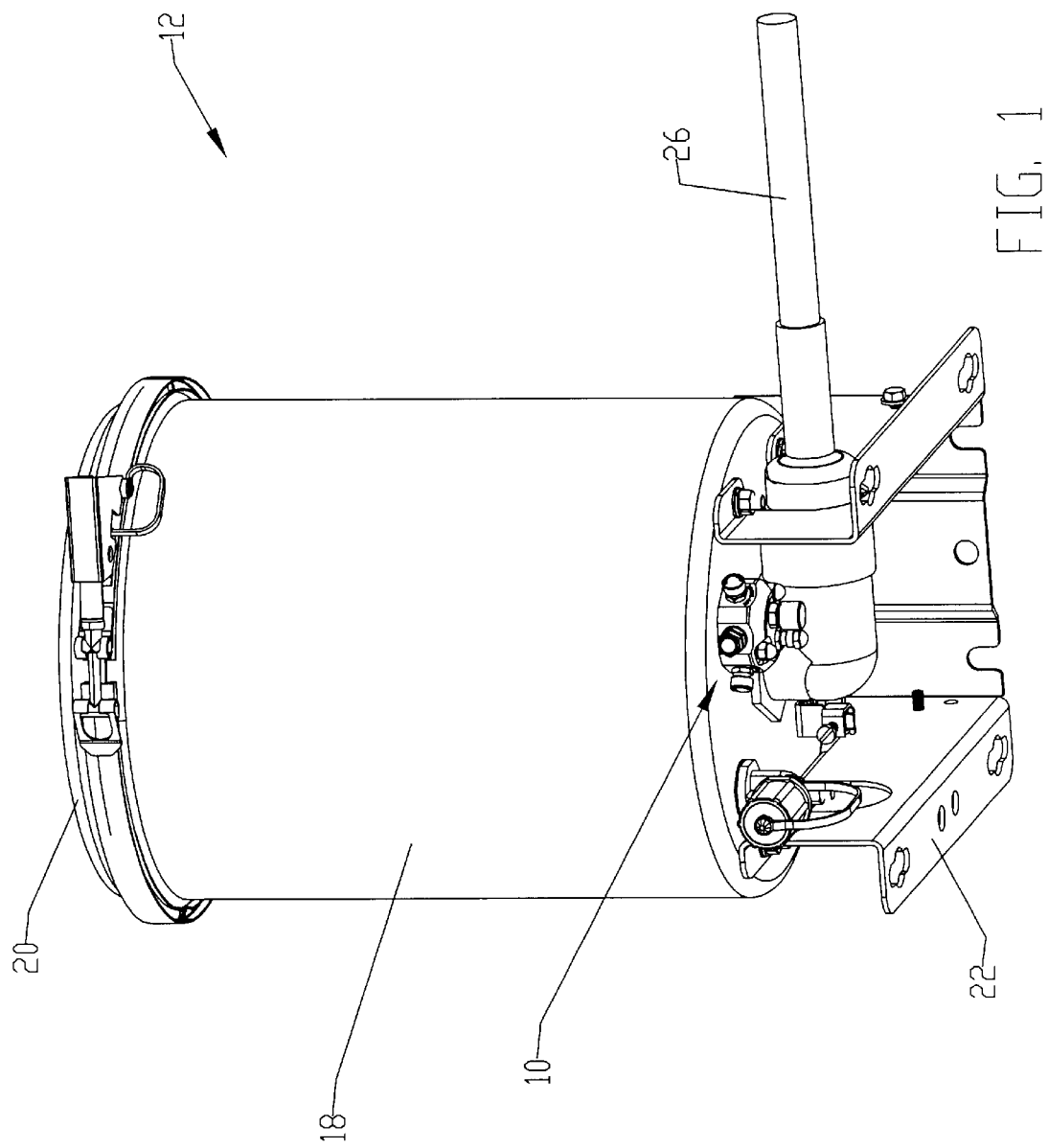
FIG. 1 is an isometric view showing a preferred embodiment of the pressurization control device of the present invention installed upon a first type of electronic equipment enclosure.
Figure 2:
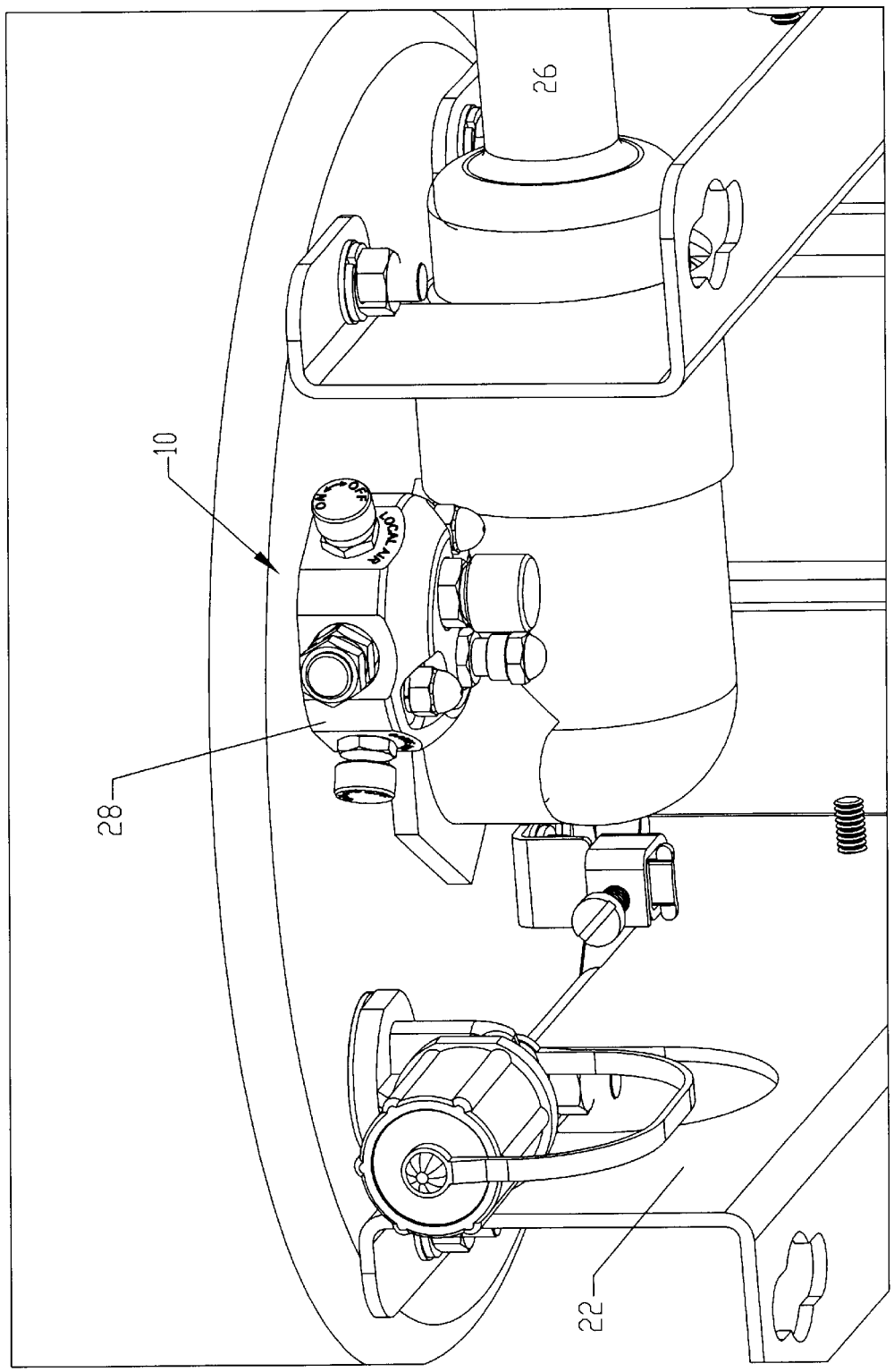
FIG. 2 is a fragmentary isometric view showing in greater detail the preferred embodiment of the pressurization control device of the present invention installed upon the first type of electronic equipment enclosure.
Figure 3:
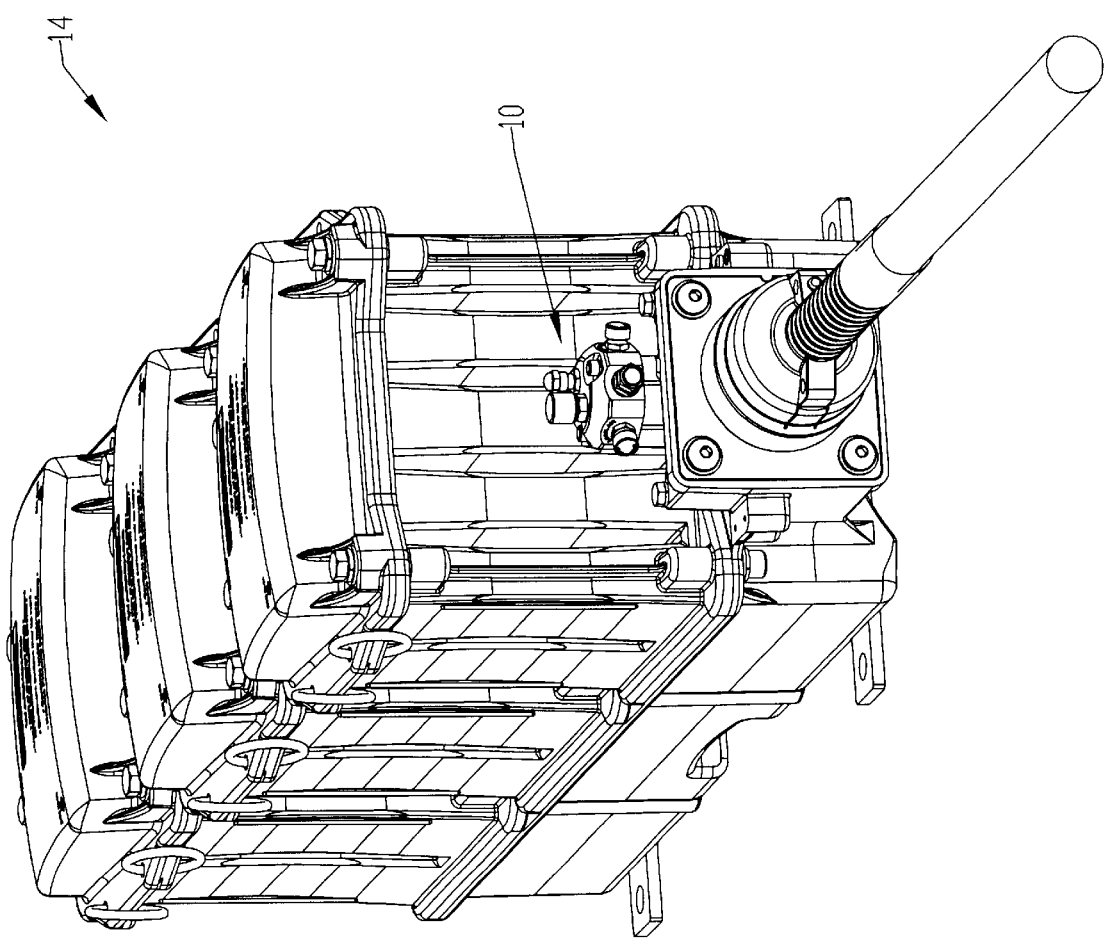
FIG. 3 is an isometric view showing the preferred embodiment of the pressurization control device of the present invention installed upon a second type of electronic equipment enclosure.
Figure 4:
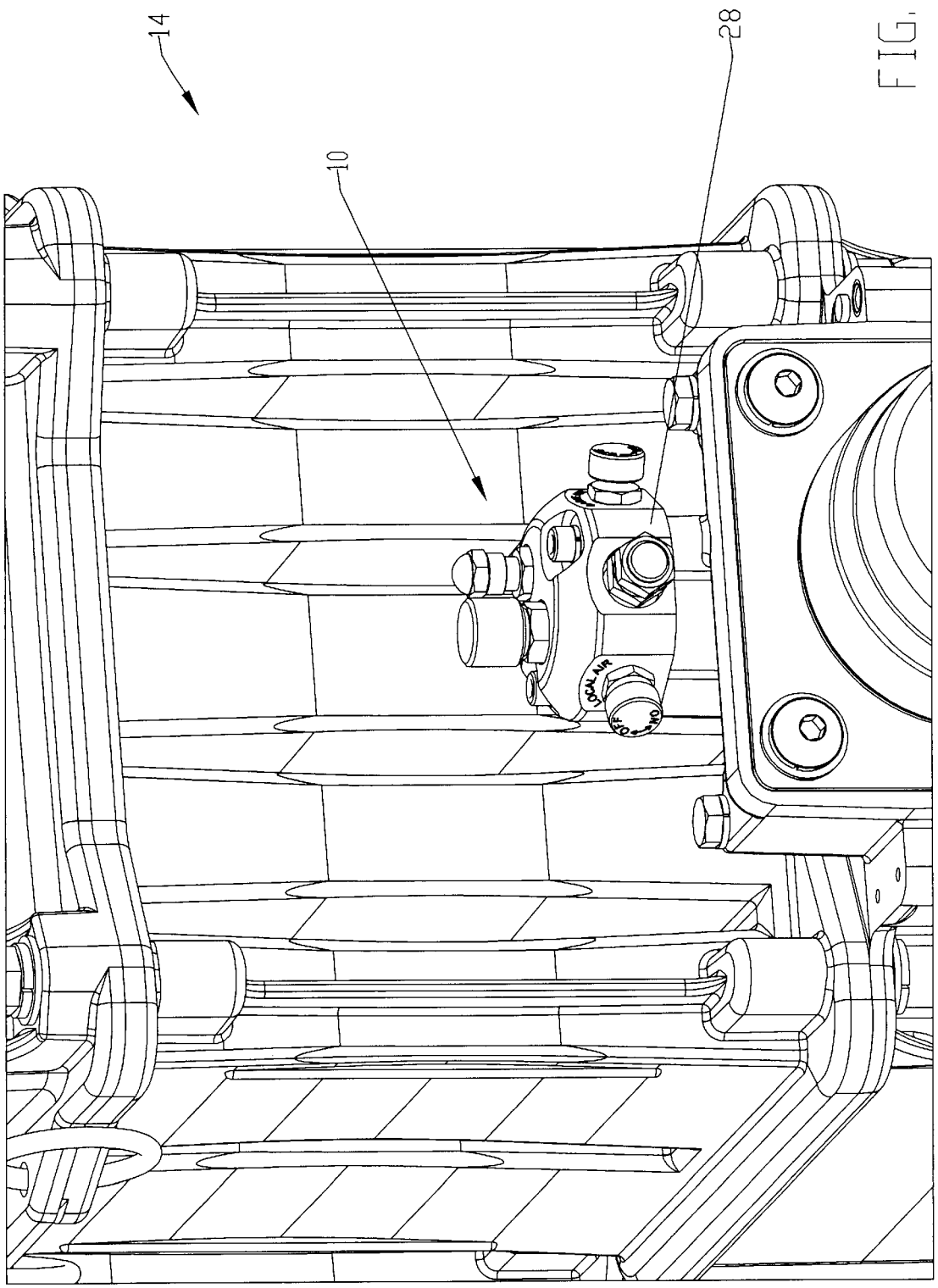
FIG. 4 is a fragmentary isometric view showing in greater detail the preferred embodiment of the pressurization control device of the present invention installed upon the second type of electronic equipment enclosure.
Figure 5:
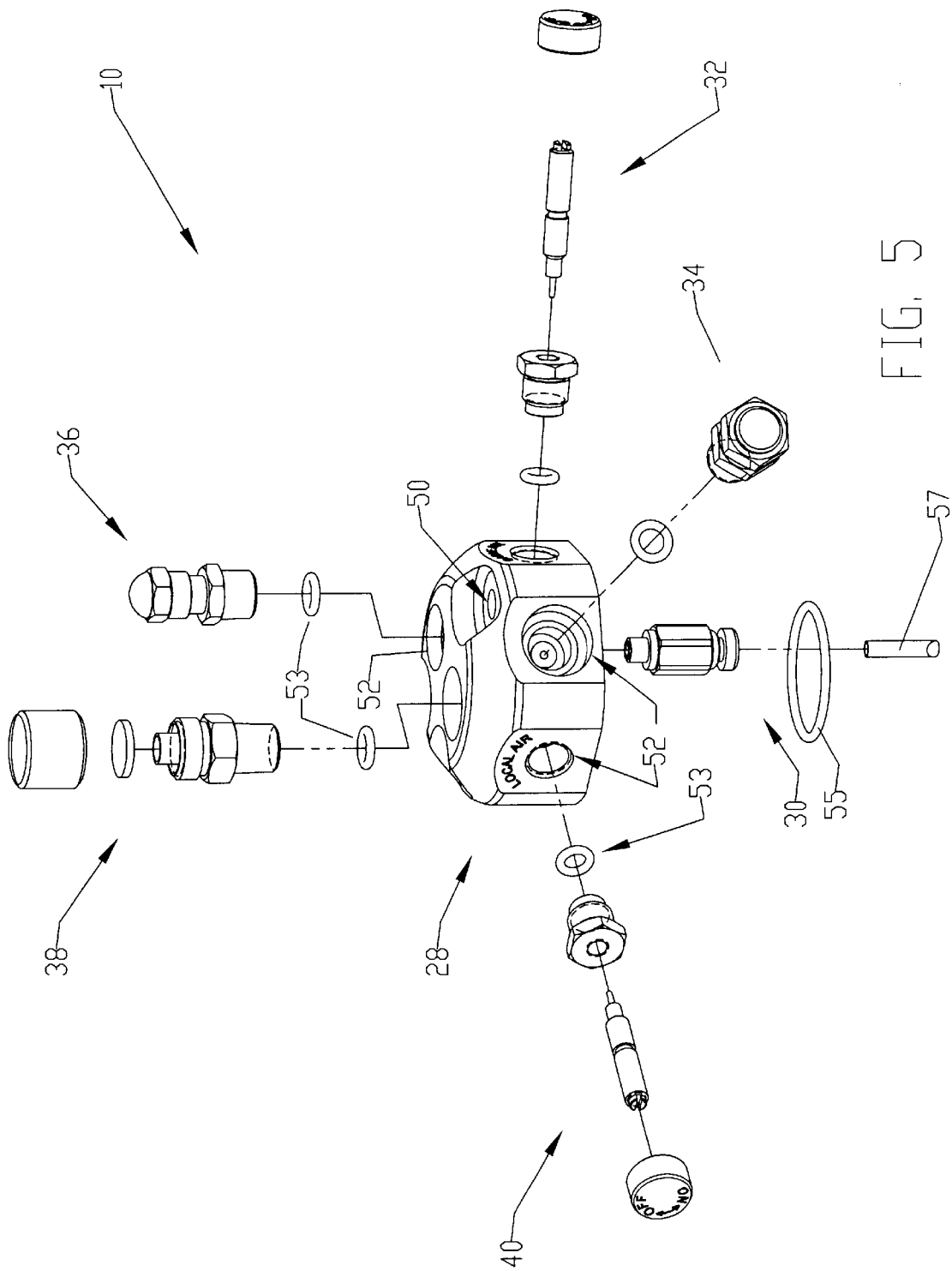
FIG. 5 is an exploded isometric of the preferred embodiment of the pressurization control device of the present invention.

Referring particularly to FIG. 1, the illustrated enclosure 12 is operable to protectively house, support, and cool signal repeater cards and other related or similar electronic telecommunication equipment. The enclosure 12 broadly comprises a body 18; a lid 20; and a mounting mechanism 22. The enclosure 12 and the electronics housed therein are coupled with a main cable trunk by a cable stub 26. Compressed air is provided to the enclosure 12 via the main cable trunk and the cable stub 26. The body 18 is operable, in combination with the lid 20 to protectively enclose the electronic equipment placed therein. The body 18 may take any practical shape, including, for example, cylindrical, as shown in FIGS. 1 and 2, or rectangular as shown in FIGS. 3 and 4, and presents an access opening for accessing the electronic equipment. The lid 20 is operable to removably seal the access opening presented by the body 18, thereby cooperating with the body 18 to enclose and protect the electronic equipment from a variety of potentially damaging or disruptive environmental or operating conditions, including sun, rain, flooding, snow, wildlife, and human tampering or vandalism. The mounting mechanism 22 is operable to provide a coupling mechanism with which to secure the enclosure 10 to a wall, pole, or other structure as desired or required.

The device 10 of the present invention is operable, when installed on the enclosure 12, to provide and control a variety of functions related to establishing and maintaining a positive pressurization of the enclosure 12. Such positive pressurization is desirable as it minimizes or substantially prevents moisture, dust and other particulate matter, and other potentially damaging materials from entering the enclosure 12.

In the illustrated preferred embodiment, referring also to FIGS. 5–9, the device 10 broadly comprises a valve body 28 to which are connected a plurality of valves or other control components, such as, for example, a cable air tube connection fitting 30; a pressure cutoff valve (PCV) 32; a pressure relief valve (PRV) 34; a static pressure valve or air stem 36; an express port 38; and an on/off valve 40. These control components may be substantially convention and commonly available, and, furthermore, it will be appreciated that additional or alternative control components may be added as desired or required without departing from the contemplated scope of the present invention. Additionally, the nature of the additional or alternative control components will depend greatly upon the particular application, including the type of enclosure, the type of electronic equipment, and the particular operating or storage conditions.

The valve body 28 provides a single, common manifold in which or to which the control components are provided or connected and through which these control components can access an interior of the enclosure 12. A plurality of mounting holes 50 are provided through the valve body 28 for accommodating bolts 51 for securing the valve body 28 to the enclosure 12 at any point on the enclosure 12, such as, for example, on the body 18 or lid 20, which can be penetrated to access the interior of the enclosure 12.

The valve body 28 may be constructed of any suitable material, take any suitable shape, and accommodate any practical number of valve or other control components. Externally, the valve body 28 provides a plurality of connection points 52, with a separate connection point 52 provided for receiving or connecting to each of the different control components. Each such connection point 52 may be provided with a small O-ring 53, gasket, or similar mechanism for preventing leaks between the valve body 28 and the connected control component. Internally, the valve body 28 provides a number of passages leading from the connection points 52 to a single penetration point into the enclosure 12. The penetration point is a shared passageway 54 or duct which projects into or otherwise aligns with an opening in the enclosure 12. A large O-ring 55, gasket, or other mechanism may be included which substantially surrounds the penetration point 54 to minimize or substantially prevent leakage between the valve body 28 and the enclosure 12.

Figure 7:
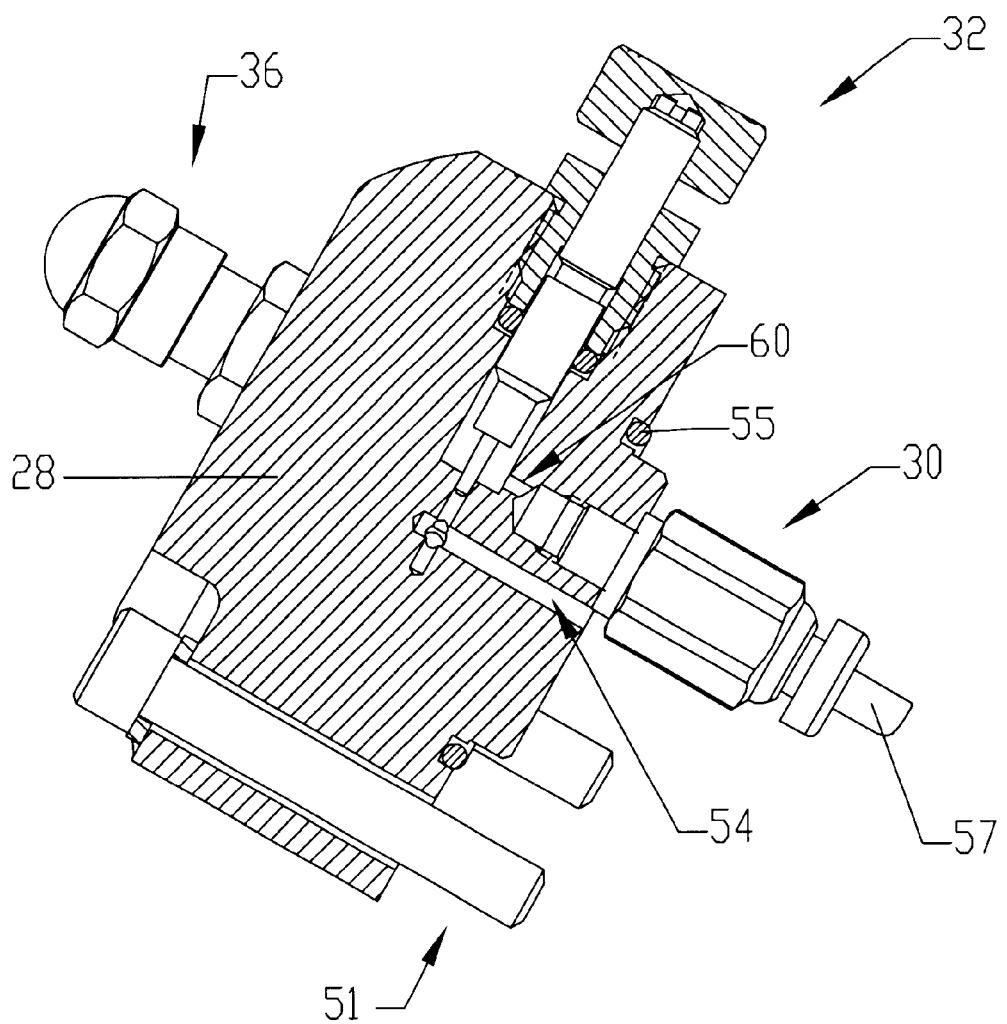
FIG. 7 is a first sectional view of the preferred embodiment of the pressurization control device of the present invention taken along line A—A of FIG. 6 to better show a pressure control valve portion of the pressurization control device.

Referring particularly, to FIGS. 6 and 7, the cable air tube connection fitting 30 is conventionally operable to receive an air tube 57 extending from the cable stub 26, and to thereby introduce the compressed air flowing from the cable stub 26 into the valve body 28. The air tube 57 is a 0.125 inch diameter plastic tube which penetrates into the cable stub 26 and is secured and sealed with a potting or sealing compound. The connection fitting 30 is located on the valve body 28 so as to project substantially into the enclosure 12 when the valve body 28 is mounted thereto. Inside the valve body 28, a first passage 60 extends from the connection point 52 for the connection fitting 30 to an inlet port of the PCV 32.

The PCV 32 is conventionally operable to start, stop, and otherwise control the flow of compressed air from the connection fitting 30 into the enclosure 12. An internal valve is manually actuatable to open and close the inlet port of the PCV 32. When the inlet port is open, air flows from the cable stub 26, through the air tube 57, through the connection fitting 30, through the first passage 60, through the PCV 32, through the penetration point passageway 54, and into the enclosure 12. The PCV 32 allows a technician desiring, for example, to open the lid 20 of the enclosure 12 to turn off the flow of compressed air prior to doing so.

Referring also to FIG. 8, the PRV 34 is conventionally operable to prevent over-pressurization of the enclosure 12 by automatically releasing air when the enclosure's internal pressure exceeds a pre-established maximum pressure. A second passage 64 connects the connection point 52 of the PRV 34 to the penetration point passageway 54. In one embodiment, the PRV 34 includes an internal spring, the loading of which is caused by and therefore corresponds to the internal pressure of the enclosure 12, and includes a built-in adjustment nut for calibrating the PRV 34 and establishing the aforementioned maximum pressure.

Referring also to FIG. 9, the static pressure valve 36, or air stem, is conventionally operable to allow for manually pressurizing the enclosure 12 using a local air source, which is useful, for example, when testing the PRV 34 and when testing the enclosure 12 for leaks. A third passage 66 connects the connection point 52 of the static pressure valve 36 to the penetration point passageway 54. In one embodiment, the static pressure valve 36 provides internal threads for coupling with a standard air stem retraction valve, and presents an outer diameter dimensioned to accept a standard air chuck.

The express fitting 38 is conventionally operable to allow for quickly pressurizing the enclosure 12 using a direct connection to a portable gas supply, such as, for example, a tank of pressurized nitrogen gas. The connection point 52 of the express fitting 38 connects to an inlet port of the on/off valve 40. When using the express fitting 38 to pressurize the enclosure 12, the PCV 32 should be placed in an off position to prevent the pressurized gas supplied by the portable gas supply from being lost or forced down the cable stub 26.

The on/off valve 40 is a substantially conventional and commonly available valve operable to stop, start, and otherwise control the introduction into the penetration point passageway 54 of the gas from the local or portable gas supply via the express fitting 38.

In operation, a technician installing the device 10 on an enclosure 12, would first connect or install the various valves or other control components on the valve body 28. Alternatively, the control components may be pre-connected or pre-installed, possibly during manufacture of the valve body 28. The small O-rings 53 are used to substantially seal each control component to the valve body 28 so that no leakage occurs therebetween. Next, the technician sets the large O-ring 55 in its proper position around the penetration point 54. Then, the air tube 57 from the cable stub 26 can be connected to the connection fitting 30. At this point, the PCV 32 should be in an off position to prevent the compressed air from escaping the valve body 28.

Next, the valve body 28 is mounted on the enclosure 12, and secured using the bolts 51 run through the mounting holes 50. The large O-ring 55 will seal the valve body 28 to the enclosure 12 so that no leakage occurs therebetween. Finally, the PCV 32 can be opened to allow compressed air to flow into and pressurize the enclosure 12. Through the various passages in the valve body 28, the various valves and other control components are selectively exposed to the pressurized interior of the enclosure 12.

From the preceding discussion, it will be appreciated that the pressurization control device 10 of the present invention provides a number of advantages over the prior art, including, for example, that it combines and integrates previously discrete valves and control components into a single valve body 28 providing a single, shared penetration point 54 into the enclosure 12, thereby substantially reducing the number of penetration points and the corresponding potential for leaks. Relatedly, the device 10 reduces manufacturing costs and installation labor by allowing the various valves and control components to be pre-installed on the valve body 28 and subsequently installed as a unit on the enclosure 12.

Although the invention has been described with reference to the preferred embodiment illustrated in the attached drawing figures, it is noted that equivalents may be employed and substitutions made herein without departing from the scope of the invention as recited in the claims. For example, as noted above, the present invention is adaptable for use on a variety of different types of electronic equipment enclosures, and is not limited to telecommunication equipment enclosures or to the illustrated enclosures. Furthermore, it will be appreciated that the valve body may be provided with a variety of additional or alternative valves or control components, and is not limited to those described herein.

Having thus described the preferred embodiment of the invention, what is claimed as new and desired to be protected by letters patent includes the following:

1. A pressurization control device for use with an electronic equipment enclosure, the pressurization control device comprising:
    a valve body providing a plurality of connection ports and a plurality of internal passages, wherein the valve body is removably securable over a single opening in the electronic equipment enclosure and the plurality of internal passages link the plurality of connection ports with the single opening; and
    a plurality of control components connected to the plurality of connection ports and linked to the single opening by the plurality of passages, wherein the plurality of control components are operable to control pressurization of the electronic equipment enclosure.

2. The pressurization control device as set forth in claim 1, wherein the plurality of control components includes a connection fitting operable to connect to an air tube extending from a cable stub, wherein the air tube and cable stub provide a flow of a gas for pressurizing the electronic equipment enclosure.

3. The pressurization control device as set forth in claim 1, wherein the plurality of control components includes a pressure cutoff valve operable to start, stop, and otherwise control a flow of a gas into the electronic equipment enclosure.

4. The pressurization control device as set forth in claim 1, wherein the plurality of control components includes a pressure relief valve operable to substantially automatically prevent over-pressurization of the electronic equipment enclosure.

5. The pressurization control device as set forth in claim 1, wherein the plurality of control components includes a static pressure valve operable to facilitate introducing a flow of a gas into the enclosure.

6. The pressurization control device as set forth in claim 5, wherein the static pressure valve provides internal threads for coupling with an air stem retraction valve, and presents an outer diameter dimensioned to accept an air chuck.

7. The pressurization control device as set forth in claim 1, wherein the plurality of control components includes an express fitting operable to allow for quickly pressurizing the electronic equipment enclosure by providing a direct connection for coupling with a local gas supply.

8. A pressurization control device for use with an electronic equipment enclosure, the pressurization control device comprising:
    a valve body providing a plurality of connection ports and a plurality of internal passages, wherein the valve body is removably securable over a single opening in the electronic equipment enclosure and the plurality of internal passages link the plurality of connection ports with the single opening; and
    a plurality of control components connected to the plurality of connection ports and linked to the single opening by the plurality of passages, wherein the plurality of control components are operable to control pressurization of the electronic equipment enclosure, the plurality of control components including:
        a connection fitting operable to connect to an air tube extending from a cable stub, wherein the air tube and cable stub provide a first flow of a gas for pressurizing the electronic equipment enclosure.

9. The pressurization control device as set forth in claim 8, wherein the plurality of control components includes a pressure cutoff valve operable to start, stop, and otherwise control the first flow of the gas into the electronic equipment enclosure.

10. The pressurization control device as set forth in claim 8, wherein the plurality of control components includes a pressure relief valve operable to substantially automatically prevent over-pressurization of the electronic equipment enclosure.

11. The pressurization control device as set forth in claim 8, wherein the plurality of control components includes a static pressure valve operable to facilitate introducing a second flow of the gas into the electronic equipment enclosure.

12. The pressurization control device as set forth in claim 11, wherein the static pressure valve provides internal threads for coupling with an air stem retraction valve, and presents an outer diameter dimensioned to accept an air chuck.

13. The pressurization control device as set forth in claim 8, wherein the plurality of control components includes an express fitting operable to allow for quickly pressurizing the electronic equipment enclosure by providing a direct connection for coupling with a local gas supply.

14. A pressurization control device for use with an electronic equipment enclosure, the pressurization control device comprising:
    a valve body providing a plurality of connection ports and a plurality of internal passages, wherein the valve body is removably securable over a single opening in the electronic equipment enclosure and the plurality of internal passages link the plurality of connection ports with the single opening; and
    a plurality of control components connected to the plurality of connection ports and linked to the single opening by the plurality of passages, wherein the plurality of control components are operable to control pressurization of the electronic equipment enclosure, the plurality of control components including:
        a connection fitting operable to connect to an air tube extending from a cable stub, wherein the air tube and cable stub provide a first flow of a gas for pressurizing the electronic equipment enclosure,
        a pressure cutoff valve operable to start, stop, and otherwise control the first flow of the gas into the electronic equipment enclosure, a pressure relief valve operable to substantially automatically prevent over-pressurization of the electronic equipment enclosure, a static pressure valve operable to facilitate introducing a second flow of the gas into the electronic equipment enclosure.

15. The pressurization control device as set forth in claim 14, wherein the static pressure valve provides internal threads for coupling with an air stem retraction valve, and presents an outer diameter dimensioned to accept an air chuck.

16. The pressurization control device as set forth in claim 14, wherein the plurality of control components includes an express fitting operable to allow for quickly pressurizing the electronic equipment enclosure by providing a direct connection for coupling with a local gas supply.

17. A pressurizeable enclosure for housing electronic equipment, the pressurizeable enclosure comprising:

a body for receiving the electronic equipment, with the body providing an access opening;

a lid for removably covering the access opening, thereby substantially enclosing the electronic equipment received within the body;

a mounting mechanism for securing the body in a mounting location; and a pressurization control device including a:

a valve body providing a plurality of connection ports and a plurality of internal passages, wherein the valve body is removably securable over a single opening in the body of the electronic equipment enclosure and the plurality of internal passages link the plurality of connection ports with the single opening, and a plurality of control components connected to the plurality of connection ports and linked to the single opening by the plurality of passages, wherein the plurality of control components are operable to control pressurization of the electronic equipment enclosure, the plurality of control components including a connection fitting operable to connect to an air tube extending from a cable stub, wherein the air tube and cable stub provide a first flow of a gas for pressurizing the electronic equipment enclosure, a pressure cutoff valve operable to start, stop, and otherwise control the first flow of the gas into the electronic equipment enclosure, and a pressure relief valve operable to substantially automatically prevent over-pressurization of the electronic equipment enclosure.

18. The pressurizeable enclosure as set forth in claim 17, wherein the plurality of control components includes a static pressure valve operable to facilitate introducing a second flow of the gas into the electronic equipment enclosure.

19. The pressurizeable enclosure as set forth in claim 18, wherein the static pressure valve provides internal threads for coupling with an air stem retraction valve, and presents an outer diameter dimensioned to accept an air chuck.

20. The pressurizeable enclosure as set forth in claim 17, wherein the plurality of control components includes an express fitting operable to allow for quickly pressurizing the electronic equipment enclosure by providing a direct connection for coupling with a local gas supply.

* * * * *